United States Patent [19]

Capri

[11] Patent Number: 5,733,199
[45] Date of Patent: Mar. 31, 1998

[54] METHOD AND DEVICE FOR THREADING NUT BLANKS

[76] Inventor: Albert Capri, 1771 Rte. 206, Southampton, N.J. 08088

[21] Appl. No.: 589,726

[22] Filed: Jan. 25, 1996

[51] Int. Cl.⁶ ..................................................... B21D 53/24
[52] U.S. Cl. .................................................. 470/98; 470/18
[58] Field of Search ..................................... 470/18, 87, 88, 470/96, 98, 102, 105, 197, 198, 199, 201, 204, 205, 206, 902; 408/72 B, 72 R, 87, 103, 241 B

[56] References Cited

U.S. PATENT DOCUMENTS

| | | | |
|---|---|---|---|
| 1,382,835 | 6/1921 | Johnson . | |
| 1,971,548 | 8/1934 | Wilcox | 10/79 |
| 2,015,596 | 6/1935 | Harvey et al. | 10/86 |
| 2,050,406 | 8/1936 | Wilson | 10/86 |
| 2,719,461 | 10/1955 | Hawker | 470/96 |
| 2,756,444 | 7/1956 | Schaeffer | 10/86 |
| 2,871,492 | 2/1959 | Sciullo | 10/86 |
| 3,359,581 | 12/1967 | Senediak | 10/10 |
| 5,062,747 | 11/1991 | Chen | 408/72 R |
| 5,203,652 | 4/1993 | Woods | 470/199 |

FOREIGN PATENT DOCUMENTS 2040765  9/1980  United Kingdom ..................... 470/96

*Primary Examiner*—Lowell A. Larson
*Assistant Examiner*—Ed Tolan

[57] ABSTRACT

A device for threading a nut blank includes an elongated guide member. Formed through the guide member is a bore. A recess is formed in the bottom end of the elongated guide member and is sized to receive a nut blank therein. A guide member holder, which includes a vertical wall and a pair of opposing horizontal walls, maintains the nut blank in the recess in the elongated member. A tap with a top end and a bottom end is adapted to be threaded through the guide member holder, through the guide member and into the nut blank. Removably secured to the top end of the tap is a tap handle for facilitating the threading of the tap into the nut blank.

11 Claims, 3 Drawing Sheets

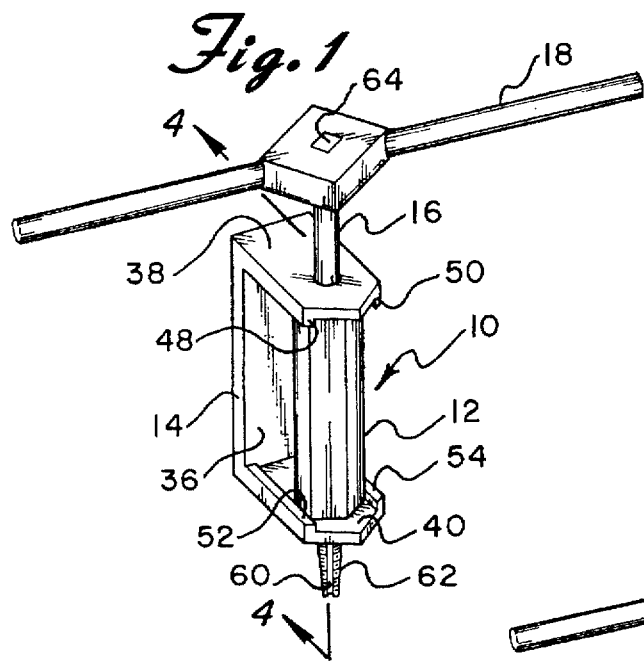
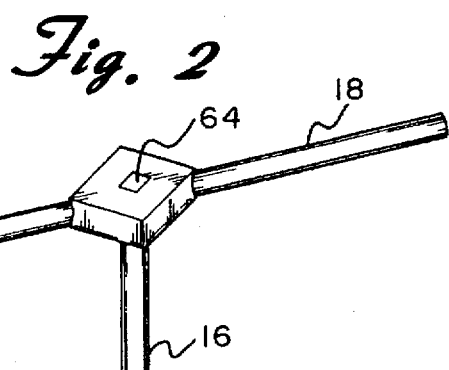
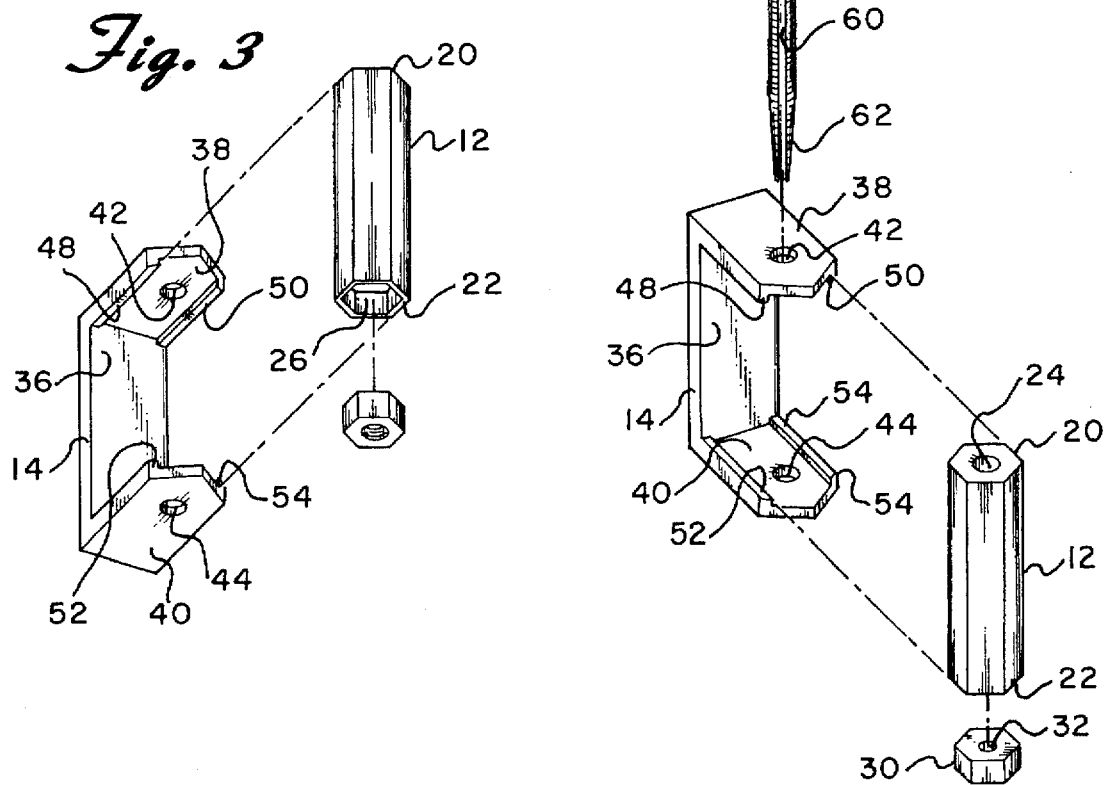

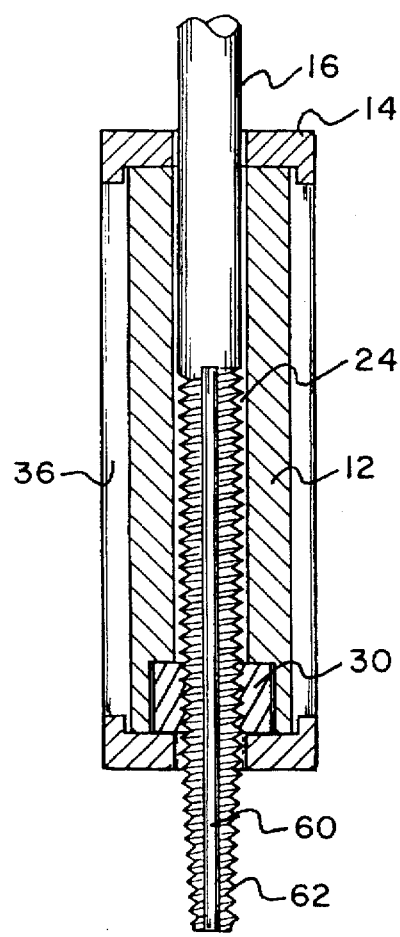
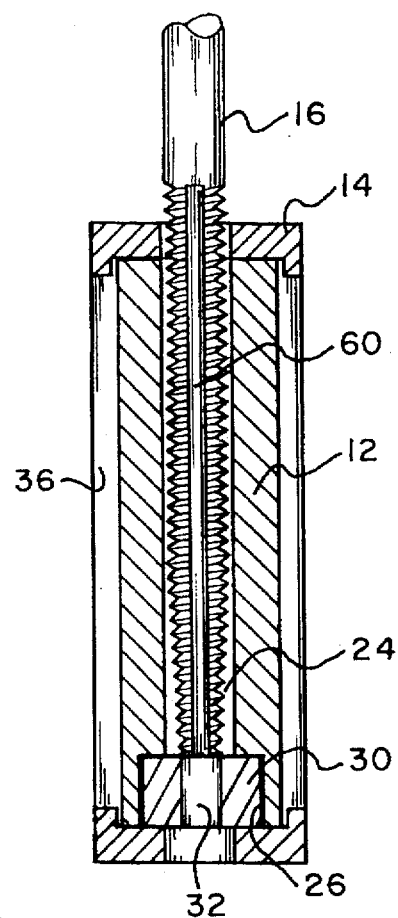
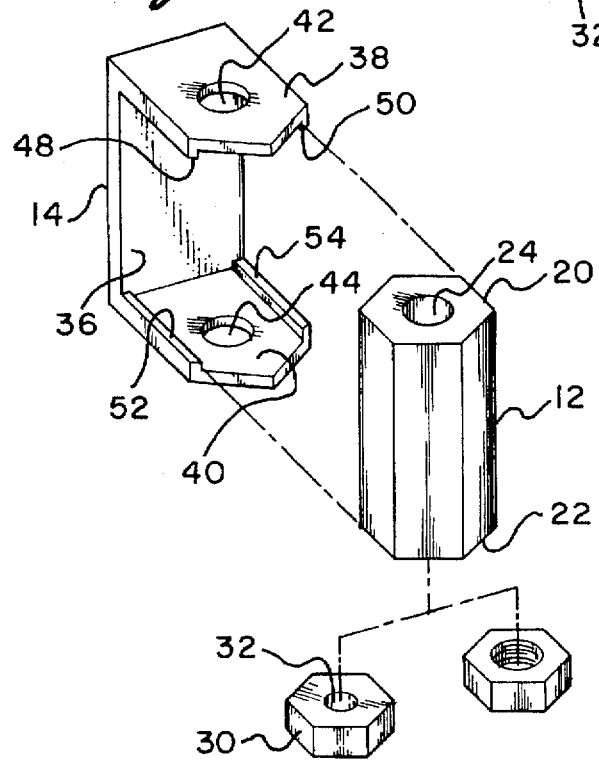

METHOD AND DEVICE FOR THREADING NUT BLANKS

BACKGROUND OF THE INVENTION

This invention is directed toward a device for manually threading nut blanks and, more particularly, to such a device that allows nuts with openings of various diameters to be readily obtained. The invention is also related to a method for threading nut blanks.

Mechanics of all types frequently utilize nuts of various diameters. Oftentimes, a mechanic will run out of appropriately sized nuts in the middle of a job. This can create substantial delays since suppliers may not have the requisite nuts in stock or may not be open the same hours as the mechanic. Further, increased costs can result since it is often required that a package of nuts be purchased instead of the exact number needed.

Accordingly, there is a need for a device that allows a mechanic to readily thread nut blanks in order to obtain nuts with threaded openings of various diameters. There are known devices which disclose the use of a tap with internal threads that are adapted to be threaded through blanks of some sort. U.S. Pat. No. 3,359,581 to Senediak discloses such a device. This patent discloses a key threading device which includes an externally threaded hand tap, a handle associated with the hand tap and a blank with a bore formed therethrough.

In use, the Senediak patent states that the hand tap is threaded through the nut blank in order to create a threaded internal opening in the same. Obviously, the diameter of the opening in the blank will depend on the diameter of the tap. The Senediak threading device is not equipped with means to secure the nut blank in place while the tap is being threaded therethrough. Further, the device is not adapted to form internally threaded openings in the nut blanks of varying sizes.

SUMMARY OF THE INVENTION

The present invention is designed to overcome the deficiencies of the prior art discussed above. It is an object of the invention to provide a device which can firmly secure a nut blank therein to facilitate the tapping of the same.

It is a further object of the invention to provide such a device which can form internally threaded openings in nut blanks to obtain nuts with threaded openings of a variety of sizes.

It is yet another object of the invention to provide a method of forming threaded openings in nut blanks.

In accordance with the illustrative embodiments, demonstrating features and advantages of the present invention, there is provided a device for threading nut blanks. The device includes an elongated guide member. Formed through the guide member is a bore. A recess is formed in the bottom end of the elongated guide member and is sized to receive a nut blank therein. A guide member holder, which includes a vertical wall and a pair of opposing horizontal walls, maintains the nut blank in the recess in the elongated member. A tap with a top end and a bottom end is adapted to be threaded through the guide member holder, through the guide member and into the nut blank. Removably secured to the top end of the tap is a tap handle for facilitating the threading of the tap into the nut blank.

Other objects, features and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a perspective view of the nut threading device of the present invention;

FIG. 2 is an exploded perspective view of the nut threading device;

FIG. 3 is a perspective view of guide member and guide holder of the present invention;

FIG. 4 is a cross-sectional view taken along lines 4—4 of FIG. 1 showing the device threaded through a nut blank;

FIG. 5 is a view similar to FIG. 4 showing a nut blank secured in the guide member;

FIG. 6 is an exploded perspective view of the elongated guide member and guide member holder.

DETAILED DESCRIPTION OF THE PREFERRED EMBODIMENTS

Figure 7:
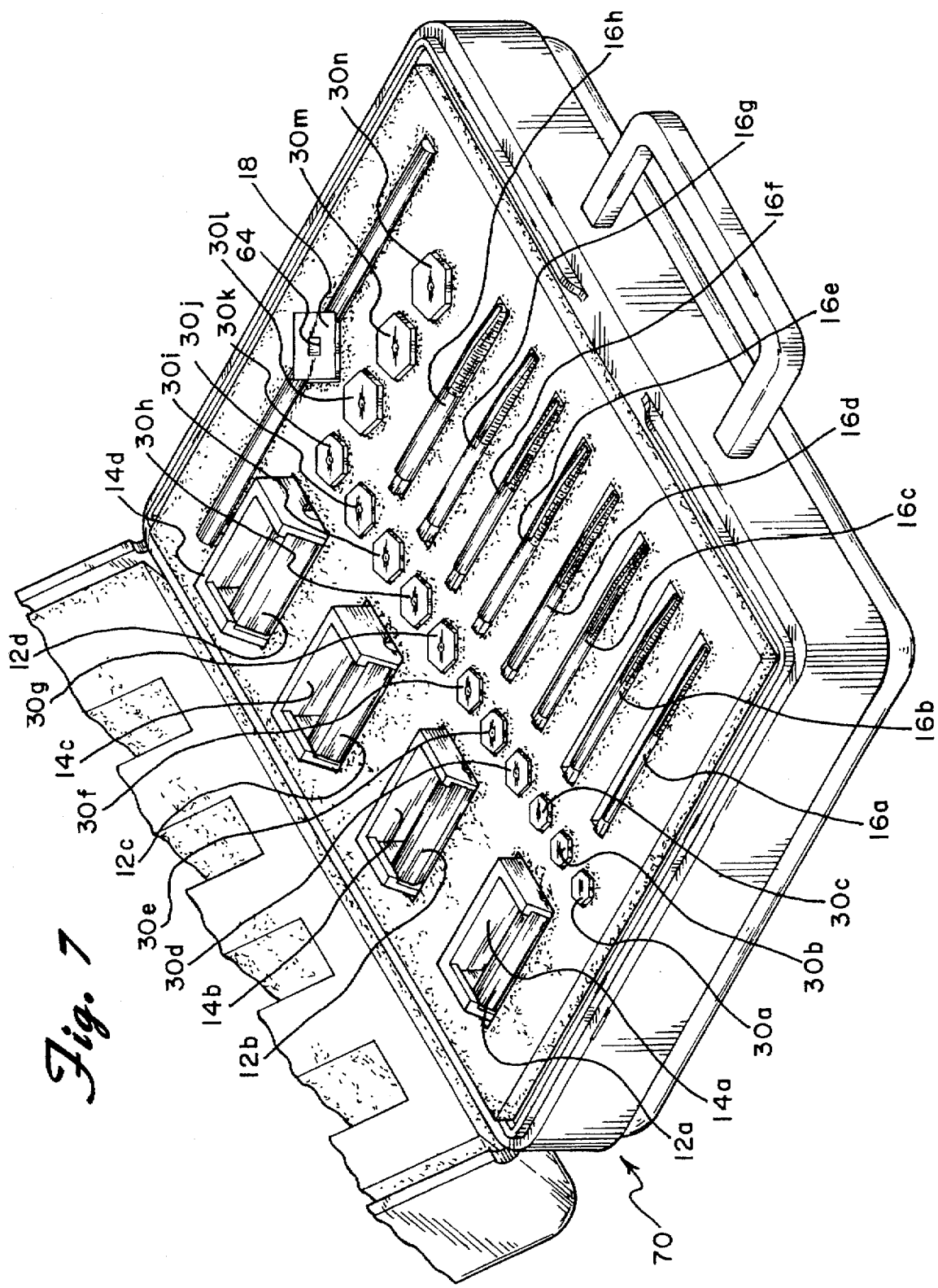
FIG. 7 is a perspective view of a kit including a number of differently sized nut blanks, elongated guide members, and taps.

Referring now to the drawings in detail wherein like reference numerals have been used throughout the various figures to designate like elements, there is shown in FIG. 1 a device for manually threading nut blanks constructed in accordance with the principles of the present invention and designated generally as 10.

The threading device 10 essentially includes an elongated guide member 12, a guide member holder 14, a tap 16 and an associated tap handle 18. The device is preferably comprised of stainless steel. However, it can be comprised of other materials such as cold roll steel, brass, aluminum or glass filled nylon.

The elongated guide member 12 includes a top end 20 and a bottom end 22 and has a bore 24 formed through the center thereof (FIGS. 2, 3 and 6). In the preferred embodiment, the periphery of the elongated guide member 12 is hexagonal in shape. Formed in the bottom end 22 of the elongated guide member is a recess 26. The recess 26 is sized to receive a nut blank 30 (FIGS. 2, 5 and 6). The nut blank 30 preferably has an unthreaded hole 32 formed therethrough (FIGS. 2 and 5). The hole 32 is aligned with the bore 24 in the elongated guide member 12 when the nut blank 30 is inserted into the recess 26. In the preferred embodiment, the perimeter of the recess 26 is slightly larger than the perimeter of the nut blank 30. Accordingly, gravity would cause the nut blank to fall out of the recess if the elongated guide member 12 was held upright.

The guide member holder 14 is designed to maintain the nut blank 30 in the recess 26. The holder 14 includes a vertical wall 36, an upper horizontal wall 38 and a lower horizontal wall 40. The horizontal walls each has an aperture 42 and 44, respectively, formed therethrough. The apertures 42 and 44 lie in the same vertical plane.

The elongated guide member 12 is slidably receivable in the guide member holder 14. More specifically, the upper horizontal wall 38 has a pair of opposing guide rails 48 and 50 extending downwardly therefrom. Similarly, the lower horizontal wall 40 has a pair of opposing guide rails 52 and 54 extending upwardly therefrom. The guide rails facilitate the receipt of the elongated guide member 12 into the guide member holder 14.

Referring to FIG. 1, 2, 4 and 5, the tap 16 is shown. The tap has a plurality of external threads formed around the lower end thereof. At least one groove 60 is formed between the external threads. The groove provides a passageway for metal that is removed from the nut blank 30 when the tap is threaded through the same. In the preferred embodiment, the tap 16 has a tapered tip 62.

Removably secured to the upper end of the tap 16 is a torque or tap handle 18. The upper end of the tap 16 preferably has a rectangularly shaped projection 64 extending upwardly therefrom. The projection 64 is designed to frictionally engage a similarly shaped opening in the torque handle 18.

Referring to FIG. 7, a kit 70 comprising a plurality of differently sized elongated guide members 12a–d, guide member holders 14a–d, taps 16a–d, and nut blanks 30a–n are shown. Each of the guide members 12a–d, guide member holders 14a–d, taps 16a–h and nut blanks 30a–n is substantially the same as the guide member 12, guide member holder 14, tap 16 and nut blank 30 discussed above. The kit 70 allows nut blanks with differently sized internally threaded openings to be formed as more fully described below.

In order to facilitate an understanding of the principles associated with the foregoing device, its operation will now be briefly described. A mechanic takes a nut blank 30 and inserts it into the recess 26 in the bottom end 22 of the elongated guide member 12. The guide member is then slid into the guide member holder 14 between the upper and lower horizontal walls 38 and 40, respectively. The guide rails 48, 50, 52 and 54 facilitate the receipt of the guide member 12 into the guide member holder. The guide member 12 is positioned between the horizontal walls so that the bore 24 in the guide member is aligned with the apertures 42 and 44 in the horizontal walls. The hole 32 in the nut blank 30 is also aligned with the apertures 42, 44 and the bore 24. The lower horizontal wall 40 prevents the nut blank 30 from falling out of the bottom end 22 of the guide member 12.

A vice or other clamping means (not shown) is then secured to guide member 12 to firmly hold the same. Thereafter, the tapered tip 62 of the tap 16 is inserted into aperture 42 in the top end 20 of the elongated guide member 12. The tapered tip 62 allows the tap to be easily guided into the aperture 42. Downward force is applied to the torque handle while the same is rotated so that the handle is moved downwardly through the aperture 42, through the bore 24, through the hole 32 in the nut blank 30 and out the aperture 44 in the lower horizontal wall 40 in the guide member holder 14 (FIGS. 4 and 5). The vice prevents the guide member 12 from rotating during the tapping of the nut blank. The hole 32 in the nut blank is smaller than the diameter of the tap 16. Accordingly, as the external threads on the lower end of the tap 16 are threaded through the nut blank 30, internal threads are formed on the same. The diameter of the resultant threaded hole created in the nut blank 30 is dependant on the diameter of the tap used.

Since mechanics often need internally threaded nuts of varying dimensions it is advantageous to have a kit 70 containing a plurality of differently sized guide members 12a–d, guide member holders 14a–d, taps 16a–h and nut blanks 30a–n (FIG. 7). More specifically, if a mechanic needs to form a nut with a relatively small internally threaded opening, he or she will internally thread a small nut blank, e.g. 30a, in the manner discussed above utilizing a small guide member, e.g. 12a, a small guide member holder, e.g. 14a, and a small tap, e.g. 16a.

In order to form nuts with larger internally threaded openings, the mechanic merely has to select nut blanks with larger holes formed therethrough and internally thread the same by using appropriately sized guide members, guide member holders and taps in the manner discussed above.

While FIG. 7 shows a plurality of nut blanks 30a–n with each having differing outside diameters, it should be readily apparent that nut blanks with holes of varying inside diameters could be utilized, but wherein the outer diameters are all the same. Even further, sets of nut blanks could be provided which may, for example, be small, medium and large with correspondingly sized inner holes formed therethrough. This allows the mechanic to stock only a limited number of nut blanks that could be used to make a large variety of different sized nuts. It should be readily apparent that the invention can be used to produce nuts of various metric and/or SAE sizes and tread depth.

The present invention may be embodied in other specific forms without departing from the spirit or essential attributes thereof and accordingly reference should be made to the appended claims rather than to the foregoing specification as indicating the scope of the invention.

What is claimed is:

1. A device for threading a nut blank comprising
   an elongated guide member having a top end and a bottom end, said elongated guide member having a bore formed therethrough;
   a recess formed in said bottom end of said elongated guide member for receiving said nut blank therein;
   means for maintaining said nut blank in said recess, said maintaining means including a guide member holder, said guide member holder including a vertical wall, an upper horizontal wall and a lower horizontal wall, each of said horizontal walls having a hole formed therethrough, said hole in said upper horizontal wall and said hole in said lower horizontal wall lying along the same vertical plane, said guide member being slidably receivable in said guide member holder so that said bottom end of said guide member rests on top of said lower horizontal wall of said guide member holder, and said bore in said guide member being aligned with said holes in said horizontal members;
   a tap having a top end and a bottom end, said tap further having a plurality of external threads formed around the periphery thereof, and
   a tap handle removably secured to said top end of said tap.

2. The device of claim 1 wherein said bottom end of said tap is tapered.

3. The device of claim 1 wherein said tap handle includes a threaded opening formed therethrough and said tap includes an externally threaded portion for threadably engaging said opening in said tap handle.

4. The device of claim 1 wherein said elongated guide member is hexagonal in shape.

5. The device of claim 1 wherein each of said horizontal walls of said guide member holder includes a pair of opposing support rails for firmly securing said guide member in said guide member holder.

6. A mechanic's kit for manually threading nut blanks comprising:
   a plurality of differently sized elongated guide members, each of said elongated guide members having a top end and a bottom end and having a bore formed therethrough, each of said elongated guide members further having recess formed in said bottom end thereof for receiving an associated one of said nut blanks therein;

means for maintaining said nut blank in said recess, said maintaining means including a plurality of differently sized guide member holders, each of said guide member holders including a vertical wall, an upper horizontal wall, and a lower horizontal wall, each of said horizontal walls having a hole formed therethrough, said hole in said upper horizontal wall and said hole in said lower horizontal wall lying along the same vertical plane, each of said guide members being receivable in a corresponding one of said guide member holders so that said bottom end of said guide member rests on top of said lower horizontal wall of said associated guide member holder, and said bore in said guide member being aligned with said holes in said horizontal walls of said guide member holder;

a plurality of differently sized taps, each of said taps having a top end and a bottom end, each of said taps further having a plurality of external threads formed around the periphery thereof, and a tap handle adapted to be removably secured to said top end of one of said taps.

7. The device of claim 6 wherein said bottom end of each of said taps is tapered.

8. The device of claim 6 wherein said tap handle includes a threaded opening formed therethrough and each of said taps includes an externally threaded portion for threadably engaging said opening in said tap handle.

9. The device of claim 6 wherein each of said elongated guide members has a hexagonally shaped periphery.

10. The device of claim 6 wherein each of said horizontal walls of an associated one of said guide member holders includes a pair of opposing support rails for firmly securing one of said guide members in said associated guide member holder.

11. A method for threading a nut blank comprising the steps of:

providing an elongated guide member having a recess formed therein and a bore formed therethrough;

inserting a nut blank having a hole formed therethrough into said recess and temporarily securing the same therein by means of a guide member holder, said guide member holder including a vertical wall, an upper horizontal wall, and a lower horizontal wall, each of said horizontal walls having a hole formed therethrough, said hole in said upper horizontal wall and said hole in said lower horizontal wall lying along the same vertical plane, said guide member being slidably receivable in said guide member holder so that said bottom end of said guide member rests on top of said lower horizontal wall of said guide member holder, and said bore in said guide member being aligned with said holes in said horizontal members;

inserting a threaded tap means into said bore in said guide member and into said hole in said nut blank, and applying downward force to said threaded tap means while rotating the same.

* * * * *